United States Patent [19]

Kulyk

[11] Patent Number: 4,765,638
[45] Date of Patent: Aug. 23, 1988

[54] NON-GROUND ENGAGING LIFTING APPARATUS FOR DETACHABLE GOOSENECK TRAILERS

[75] Inventor: John W. Kulyk, Albion, Pa.

[73] Assignee: Rogers Brothers Corporation, Albion, Pa.

[21] Appl. No.: 34,676

[22] Filed: Apr. 6, 1987

[51] Int. Cl.[4] .............................................. B62D 53/06
[52] U.S. Cl. .......................... 280/423 B; 280/425 A; 414/481
[58] Field of Search ...................... 280/425 A, 423 B; 414/481

[56] References Cited

U.S. PATENT DOCUMENTS

| 3,632,139 | 1/1972 | Stafford | 280/425 A |
| 4,078,684 | 3/1978 | Hasenberg et al. | 280/423 B |
| 4,513,987 | 4/1985 | Whitaker | 280/423 B |

FOREIGN PATENT DOCUMENTS

| 620378 | 3/1949 | United Kingdom | 280/425 A |
| 778055 | 7/1957 | United Kingdom | 280/423 B |

Primary Examiner—John A. Pekar
Attorney, Agent, or Firm—Charles L. Lovercheck; Wayne L. Lovercheck; Dale R. Lovercheck

[57] ABSTRACT

The present invention is comprised of cylinders with extensible pistons which extend between first points located on a trailer and second points located on a gooseneck which interconnects the trailer to a tractor. The gooseneck and the trailer are rotatably coupled to one another at a common pivot point. The first points and second points are arranged relative to one another such that as the piston in the cylinder is extended or retracted, the gooseneck and trailer are respectively raised or lowered relative to the ground. The gooseneck is arranged so that it substantially encloses the cylinders throughout their entire range of travel thereby protecting them from damage. In addition, a locking apparatus permits locking the pistons to both the first and second points to present rotation of the gooseneck relative to the trailer. Thus the gooseneck and trailer can be removed from the tractor as a single unit.

17 Claims, 2 Drawing Sheets

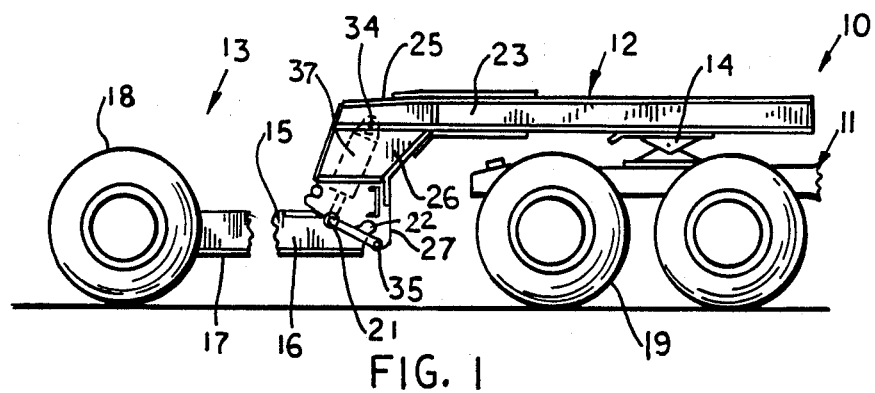
FIG. 1
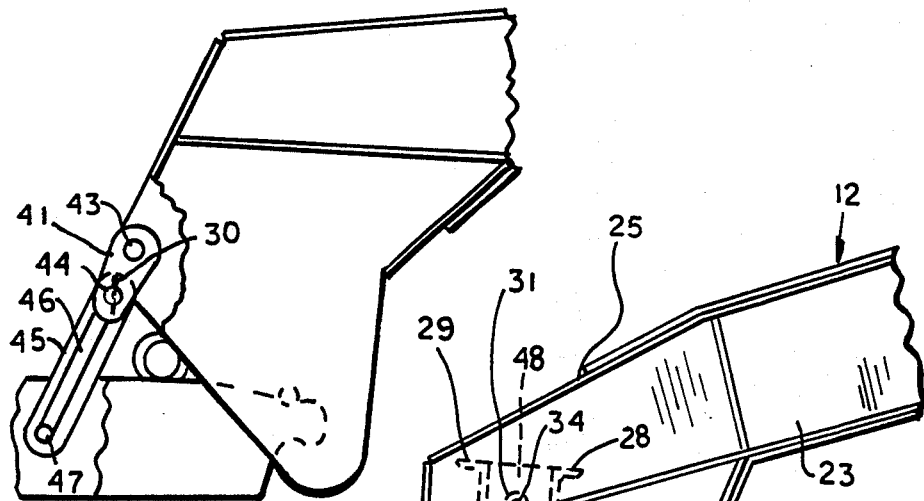
FIG. 7
FIG. 2

NON-GROUND ENGAGING LIFTING APPARATUS FOR DETACHABLE GOOSENECK TRAILERS

BACKGROUND OF THE INVENTION

This invention relates to an improved apparatus for raising and lowering detachable gooseneck trailers between their driving and loading positions, and in particular to such an apparatus which moves smoothly and efficiently between raised and lowered positions without engaging the ground as a lifting point.

The apparatus further relates to an improved apparatus for holding a gooseneck erect on a trailer when the tractor has been disconnected. The conventional detachable gooseneck trailer is arranged so that the trailer's front end can be lowered to the ground and disconnected from the gooseneck in order to facilitate loading from the front end. This is accomplished by using a gooseneck to interconnect the trailer to the tractor, with the front end of the gooseneck which is attached to the tractor by means of a fifth wheel and its rear end is attached to the trailer by means of a hook coupling. Accordingly, when the rear end of the gooseneck is raised or lowered it also moves the front end of the trailer to a raised or lowered position.

The gooseneck is raised and lowered by means of hydraulic jacks which are attached to the gooseneck and this arrangement has not always been effective due to the fact that the jacks raise the gooseneck by having their rams extended while in contact with the ground on which the trailer rests. Since trailers of this type generally are used for transporting construction equipment, they are often used on muddy terrain or terrain which will not otherwise support the weight of the trailer on the limited area of the support pad of the hydraulic jacks. In this event the hydraulic jacks tend to sink into the ground rather than lifting the trailer.

To overcome this problem, a non-ground engaging lift system has been provided in which the hydraulic jack(s) push against the trailer instead of the ground in a loading position. The weight of the trailer is supported by the front end of the trailer. By providing a lifting system which is not required to interact with the surrounding terrain many of the shortcomings of earlier lifting apparatus were overcome. In a typical non-ground engaging system the lifting apparatus comprises extensible piston cylinders which are attached pivotably at their cylinder ends to the gooseneck. The shafts of the piston cylinders slidably contact ramps on the trailer at points defined by fore and aft stops. Thus when the shafts of the piston cylinders are extended, the points at which they are connected to the gooseneck are moved away from the points at which they contact the trailer, causing the trailer and gooseneck to rotate in opposite directions about their common pivot point at the hook coupling. The end points of the piston cylinders and the pivot point are arranged relative to one another so that as this occurs the rear end of the gooseneck and the front end of the trailer are raised. Conversely, as the piston cylinder shafts are retracted the gooseneck and trailer rotate in opposite directions about the pivot point and the front end of the trailer and the rear end of the gooseneck are lowered.

A drawback to the non-ground engaging system known in the art is that as the geometry changes by the extension or retraction of the ram and the relative positions of the pivot point, gooseneck contact point and trailer contact point, the change is accommodated by the sliding engagement of the ram on the trailer. This sliding engagement is irregular imparting shocks to the hydraulic system and is unconstrained, requiring stops or other structure to keep the sliding movement within acceptable bounds. Bending forces on the ram damaging to the system result from this uncontrolled point.

REFERENCE TO PRIOR ART

Applicant is aware of U.S. Pat. No. 2,590,210 issued to H. L. Rogers on Mar. 25, 1952. Applicant is also aware of U.S. Pat. No. 4,513,987 to Whitaker which shows in its alternate form FIG. 8, a gooseneck trailer wherein cylinders are pivoted to the gooseneck frame and each has a piston rod with an angle iron-shaped link 38 pivoted to the frame and attached to the piston rods. The flange of the angle iron link 38 slides on positioning pad 30 as the gooseneck is being coupled to the trailer. The frictional force between the angle iron 38 and the trailer frame during the connecting process could interfere with the process of making the connection. Applicant's roller eliminates the disadvantage and will roll quickly into position. Moreover, the device of the U.S. Pat. No. 4,513,987 Patent is intended to be a locking device and not a lifting device for lifting the trailer.

SHORT STATEMENT OF THE INVENTION

The new gooseneck disclosed herein is completely detachable with features that truckers and haulers have wanted but could not get previously. The gooseneck will operate for a long time without any serious maintenance or repair. It is lighter than other non-ground engaging detachables so there is an overall economy in load reduction. Instead of a heavy and bulky design requiring four hydraulic cylinders the inventor has simplified the lift and lower system which is safe and easy. The main features of the new gooseneck are (1) the beam hook connection (2) the hydraulic system (3) the trap door (4) the pin connections and (5) the links that support the gooseneck when the tractor is removed.

In operation, the tractor does not have to be lined up perfectly with the trailer for the gooseneck to connect to the trailer. A little slack is provided and when the trucker feels that the solid connection has been made, he stops the tractor. On the end of the hydraulic cylinder heavy duty rollers are mounted. This unique design allows the gooseneck to gently roll up on the deck and secure the trailer. There is no flat steel surfaces to rub together and stress.

The hydraulic system handles the load with ease and lifts the trailer to the point where the trap doors can be engaged. The doors come down, are locked and the bed lowered. Now the weight of the load is providing almost perfect rigidity to the connection; but there are still some quick safety connections to make. Under the gooseneck are two pins designed to retain the beam hook connections even over the roughest potholes. From out of the deck come two bars or links which mate with lugs welded to the gooseneck. The fifth wheel can be disconnected and the tractor driven away and the gooseneck stays upright held by links.

In summary, the tractor and gooseneck combination are first backed up, the gooseneck drops a bit as the beam hooks find their locking position, then the hydraulic system lifts the trailer bed. The trap doors are lowered and locked. The hydraulics are lifted slightly to relieve pressure on the cylinders and the trailer is rigidly locked. Then the operator connects the brake line and electrical cable. Next the pins below the neck are inserted to lock the hooks together, and finally the safety bars that are recessed into the deck are lifted and cotter keys are inserted. Connection of the gooseneck ordinarily takes less than 120 seconds.

Accordingly, the lifting apparatus of the present invention includes at least one extensible piston cylinder which is attached pivotally at its cylinder end to the gooseneck. The ram of the cylinder is pivotally connected to a positioning member which extends between the end of the ram and the pivot point. The positioning member is rotatably supported on the gooseneck adjacent the pivot point between the trailer and gooseneck and provides a constant distance from the pivot point to the point where the roller engages the trailer. The rollers are provided at the end of the ram to permit smooth, even movement of the ram across the trailer as the trailer is being connected.

Accordingly it is a principal object of the present invention to provide a practical lifting apparatus for low-boy trailers which is entirely self-contained and which does not require interaction with the ground on which the trailer is supported.

It is the further object of the present invention to provide a trailer lifting device which will raise the front end of a trailer efficiently, smoothly and with minimum damage to the hydraulic system.

Another object of the invention is to provide a trailer coupling device wherein hydraulic piston rods having rollers on them engage the trailer frame and exert a force such as to lift the trailer frame.

Another object of the invention is to provide a gooseneck for a trailer and links on the trailer frame that can be connected to the gooseneck to hold the gooseneck in position when the tractor is removed from the trailer.

The foregoing objectives, features and advantages of the present invention will be more readily understood upon consideration of the following detailed description of the invention taken in conjunction with the accompanying drawings.

BRIEF DESCRIPTION OF THE DRAWINGS

Other objects, features and advantages of the present invention will become more fully apparent from the following detailed description of the preferred embodiment, the appended claims and the accompanying drawings in which:

FIG. 1 is a partial side elevational view of a tractor trailer and gooseneck embodying the lifting apparatus of the present invention with one side partly broken away to show the inside parts.

FIG. 2 is a partial side view of the gooseneck and trailer of Figure 1 shown disconnected from the trailer with one side of the trailer broken away to show the inside parts.

FIG. 7 is an enlarged partial side view of the gooseneck and trailer.

DETAILED DESCRIPTION OF THE PREFERRED EMBODIMENT

Figure 3:
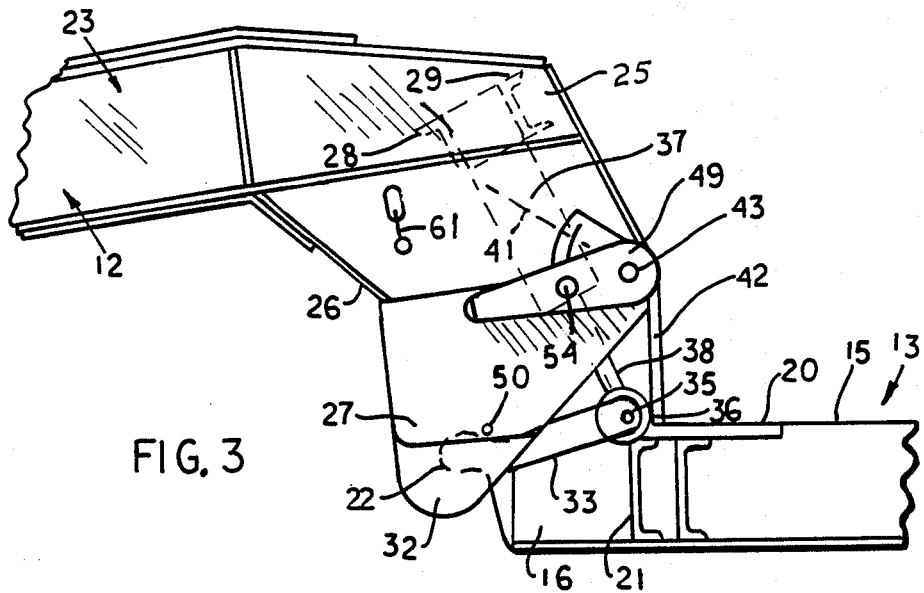
FIG. 3 is a partial side view of the gooseneck and trailer shown connected together.
Figure 4:
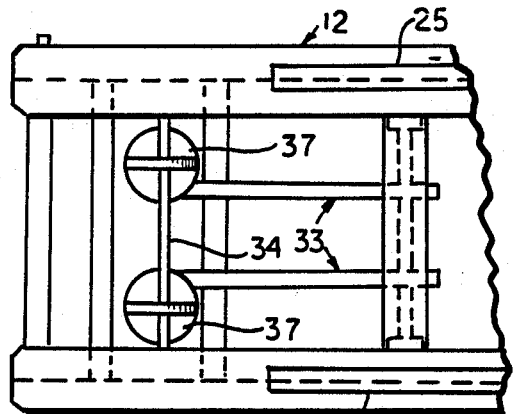
FIG. 4 is a partial top view of the gooseneck according to the invention.
Figure 5:
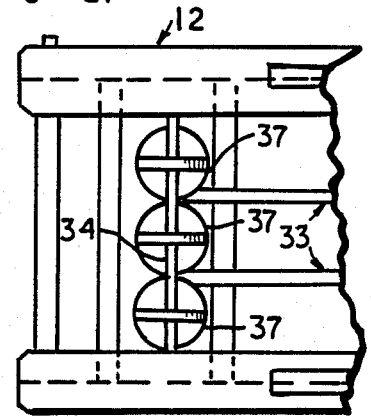
FIG. 5 is a partial top view of another embodiment similar to FIG. 4 of a gooseneck having three lifting cylinders.

Referring to FIG. 1 of the drawings, the present invention includes a combination 10 of a tractor 11, a gooseneck 12 supported on the tractor by a fifth wheel 14 and a trailer 13 of the type commonly referred to as a low-boy trailer. Trailer 13 has a frame 15 which may be made of laterally spaced I-beams with wheels 18 at its rear portion only. The front portion of trailer 13 may have ramps with upwardly facing surfaces arranged to allow a vehicle to be driven up onto the bed of the trailer 13 when the trailer is lowered to a loading position, and the gooseneck has been removed, as shown in FIG. 2, with the front end 16 of the frame 15 in contact with the ground. The trailer 13 may be raised to the driving position, shown in FIGS. 1 and 3. The tractor 11 has ground engaging wheels 19.

The trailer frame 15, as shown in FIGS. 1 and 2, is made of spaced parallel longitudinally extending I-beam frame members that are attached at the rear end 17 to the rear axle supported on the wheels 18. The front end 16 of the trailer frame terminates in downwardly facing hooks 22. The I-beam frame members are connected together at the front end 16 of the trailer by the laterally extending channel members 21 on which the rollers 36 of the lifting arrangement of the gooseneck may rest when the front end of the trailer is being lifted. An inclined surface 20 is formed on the front end of the trailer on which the rollers 36 will roll into a seatable position when the front end of the trailer is lifted.

The gooseneck 12 has spaced parallel frame members 23 having rear frame members 25 welded to them. Frame members 25 are held together by channels 28 and 29. The intermediate gooseneck frame part 26 is in turn welded to the lower gooseneck part 27.

The gooseneck 12 is held in erect position by links 45 when the tractor is removed. The links 45 are supported on the front end 16 of the frame of the trailer. Links 45 have a longitudinal slot 46 which receives the laterally extending axle 47 which has its ends attached to the frame members of the trailer frame 15. Thus, when the gooseneck is in position, the links 45 can be pulled manually upwardly to the position shown in FIG. 7, and be attached to the gooseneck by removable pins 44. Pins 44 pass through lugs 41 and cotter pins 30 are put in place to hold the gooseneck erect when the tractor is removed.

As shown in FIG. 2, the plates 48 have their ends welded to the channels 28 and 29. Plates 48 have an axle 34 attached to them. Axle 34 is received in the upper end bracket 31 of the hydraulic cylinders 37. The hydraulic cylinders 37 swing about the axle 34. The cylinders 37 have piston rods 38, the lower end of which is fixed to the axle 35. Spaced heavy duty rollers 36 are likewise supported on axle 35. The first end of guide member 33 receives axle 35. The second end 39 of guide member 33 receives the pin 51 by which guide member 33 is connected to the lower part 27 of the gooseneck frame.

Figure 6:
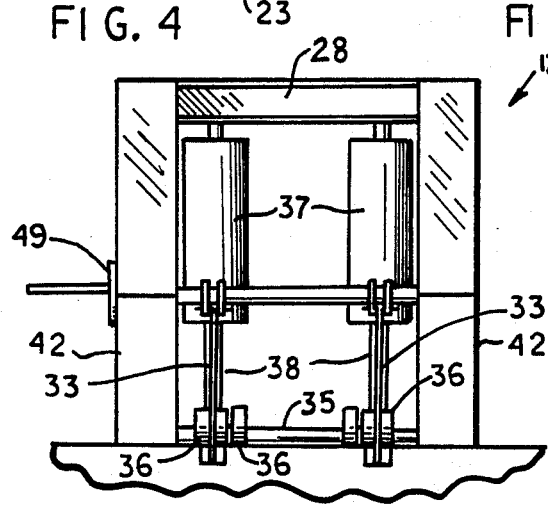
FIG. 6 is a partial rear view of the gooseneck and trailer.

As indicated in FIG. 6, the pairs of heavy duty rollers 36 are supported on the axle 35 on each side of each guide member 33.

As shown in FIG. 3, trap doors 42 are provided on the rear part of the gooseneck to take the weight of the trailer off of the hydraulic cylinders 37 when the tractor and gooseneck are connected to the trailer. The trap doors 42 have their upper end fixed to third axle 43.

When the trap doors 42 are lowered, the lower end of the trap doors 42 rest on the frame 15 of the trailer when the handle 49 is in the position shown in FIG. 3. When the handle 49 is swung to the upward position 40, indicated by dotted lines, in FIG. 3, the lower end of trap doors 42 will be out of engagement with the trailer frame 15. The trap doors 42 can be locked in their upper or lower position by lock 54.

When it is desired to connect the gooseneck 12 to the trailer 13, the tractor is backed up until the gooseneck 10 and tractor assume the positions in front of the trailer shown in FIG. 2. The tractor will then be backed up so that the heavy duty rollers 36 roll upward on the inclined surface 20 slightly raising the gooseneck 12 and allowing hook 32 to move in a position under the hook 22 on the trailer. When hook 32 is in position under the hook 22, the hydraulic cylinders 37 will be actuated, by handle 61 bringing the heavy duty rollers 36 down against the channels 21 at the front end 16 of frame 15 and causing the hook 32 to firmly seat in hook 22. As the hydraulic cylinders 37 continue to extend, the front end of trailer 13 will be lifted, actuating the cylinders 37. When the trailer front end is lifted, the trap doors will be locked in their lower position and safety pin 50 may be placed into a position in gooseneck 12 over hook 22 to prevent the hook 22 from disengaging from hook 32 during operation of the trailer over the road.

While the present invention has been disclosed in connection with the preferred embodiment thereof, it should be understood that there may be other embodiments which fall within the spirit and scope of the invention as defined by the following claims. The terms and expressions which have been employed in the foregoing specification are used therein as terms of description and not of limitation, and there is no intention in the use of such terms and expressions, of excluding equivalents of the features shown and described or portions thereof, it being recognized that the scope of the invention is defined and limited only by the claims which follow.

I claim:

1. In combination, a trailer and a gooseneck for connecting a tractor to said trailer comprising, said trailer having a frame and ground engaging wheels, connecting means on said tractor for connecting said trailer to said tractor, first pivot means on said gooseneck for connecting said gooseneck to said trailer, said gooseneck has a lifting mechanism thereon, said lifting mechanism comprises at least one hydraulic cylinder, said hydraulic cylinder being swingably attached to said gooseneck frame at a position spaced from said connecting means, said hydraulic cylinder having a piston rod connected to a first axle, guide means on said gooseneck for guiding said first axle in a predetermined path relative to said gooseneck roller means on said first axle adapted to engage said trailer frame at a position spaced from said connecting means.

2. The combination recited in claim 1 wherein said guide means on said first axle comprises a first guide member, said first guide member having a first end connected to said first axle and having a second end swingably attached to said gooseneck frame at a position spaced from said connecting means, said first axle having means thereon to engage said trailer frame to lift said trailer and means on said gooseneck to hold said trailer in lifted position independent of said hydraulic cylinder.

3. The combination recited in claim 2 wherein means on said first axle engaging said trailer frame comprises spaced rollers, said rollers being adapted to rest on said trailer frame while said lifting mechanism is lifting said trailer.

4. The combination recited in claim 2 wherein said trailer frame comprises spaced longitudinally extending frame members extending from said rear wheels to the front of said trailer, laterally extending frame members are attached to said longitudinally extending frame members providing means for said rollers to rest upon.

5. The combination recited in claim 4 wherein said gooseneck comprises longitudinally spaced frame members, cross members connecting said longitudinally extending frame members together, said means on said gooseneck frame connecting said gooseneck to said trailer comprising said longitudinally extending frame members terminating at the rear end of said gooseneck in two spaced upwardly facing hooks attached to said gooseneck frame members, said upwardly facing hooks receiving downwardly facing hooks on said trailer.

6. The combination recited in claim 2 wherein said means to hold said trailer in a lifted position comprises a door swingably attached to said gooseneck.

7. The combination recited in claim 1 further comprising a second cylinder, said second cylinder having a second piston rod, a second guide member swingably attached to said gooseneck frame, said second guide member having a second end connected to said first axle, said second piston rod being connected to said first axle, two second spaced rollers on said first axle, said second rollers engaging said trailer frame.

8. In combination, a trailer and a gooseneck, said gooseneck having a frame, said trailer having a frame and ground engaging wheels, means on said trailer frame for connecting said trailer to connecting means on said gooseneck, first pivot means on said gooseneck for connecting said gooseneck to a tractor, said connecting means on said gooseneck comprising a plurality of pairs of spaced links, said links having a first end and a second end, said first end of each said link having second pivot means connecting said first end of said link to said gooseneck, a plurality of hydraulic cylinders having a first end and a piston rod, said hydraulic cylinders being swingably connected to said gooseneck frame, a first axle connected to said piston rods and to said scond ends of said link, spaced pairs of rollers on said first axle, one said link being disposed between said rollers of each said pair of rollers, said rollers engaging said trailer frame whereby said trailer frame is lifted when said connecting means connects said gooseneck to said trailer, said rollers engage said trailer frame when said piston rods are extended relative to said cylinder.

9. The combination recited in claim 8 wherein said trailer frame comprises longitudinally extending laterally spaced frame members, said rollers rest on said laterally extending members.

10. The combination recited in claim 9 wherein a link is swingably attached to said trailer frame and adapted to be attached to said gooseneck frame at a position spaced from said first axle whereby said gooseneck is held in position with said trailer frame when the front end of said trailer frame is unsupported.

11. A lifting apparatus for a gooseneck comprising:
first pivot means on said gooseneck,
a first guide member having a first end and a second end,
said first guide member being rotatably attached at its first end to said first pivot means and extending therefrom,
a first attaching means on said gooseneck at a position spaced from said first pivot means,
a lifting mechanism having a first end and a second end,
said lifting mechanism being rotatably attached at its first end to said first attaching means on said gooseneck for moving said gooseneck from a first position to a second position,
a trailer engaging means spaced from said gooseneck,
said trailer engaging means being rotatably connected to said second end of said first guide member and being rotatably connected to said second end of said lifting mechanism,
said trailer engaging means being spaced from said first pivot means and from said first attaching means whereby said second end of said lifting mechanism will be guided by said first guide member as said lifting mechanism is operated to raise and lower a trailer.

12. The lifting apparatus recited in claim 11 wherein said trailer engaging means comprises a first axle.

13. The lifting apparatus recited in claim 12 further comprising:
roller means supported on said first axle adapted to engage said trailer while said lifting mechanism is lifting said trailer.

14. The lifting apparatus recited in claim 13 wherein said roller means comprises spaced rollers.

15. The lifting apparatus recited in claim 12 further comprising:
a second guide member having a first end and a second end,
said second guide member being rotatably attached at its first end to first pivot means,
said second end of said second guide member being rotatably attached to said first axle.

16. The lifting apparatus recited in claim 15 further comprising roller means supported on said first axle adapted to engage said trailer while said lifting mechanism is lifting said trailer.

17. The lifting apparatus recited in claim 11 wherein said lifting mechanism comprises a hydraulic cylinder.

* * * * *